US011161527B2

(12) United States Patent
Sutter

(10) Patent No.: US 11,161,527 B2
(45) Date of Patent: Nov. 2, 2021

(54) CART CONVEYOR ASSEMBLY

(71) Applicant: Jonathan Sutter, Seattle, WA (US)

(72) Inventor: Jonathan Sutter, Seattle, WA (US)

( * ) Notice: Subject to any disclaimer, the term of this patent is extended or adjusted under 35 U.S.C. 154(b) by 518 days.

(21) Appl. No.: 16/111,129

(22) Filed: Aug. 23, 2018

(65) Prior Publication Data

US 2019/0061785 A1 Feb. 28, 2019

Related U.S. Application Data

(60) Provisional application No. 62/550,515, filed on Aug. 25, 2017.

(51) Int. Cl.
| *B61B 7/04* | (2006.01) |
| *B61B 11/00* | (2006.01) |
| *D06F 95/00* | (2006.01) |
| *B65G 35/00* | (2006.01) |
| *B65G 19/02* | (2006.01) |

(52) U.S. Cl.
CPC .............. *B61B 7/04* (2013.01); *B61B 11/004* (2013.01); *D06F 95/00* (2013.01); *B65G 19/02* (2013.01); *B65G 35/00* (2013.01); *B65G 2201/0229* (2013.01); *B65G 2812/99* (2013.01)

(58) Field of Classification Search
CPC ......... B61B 7/04; B61B 11/004; D06F 95/00; B65G 19/02; B65G 35/00; B65G 2201/0229; B65G 2812/99
See application file for complete search history.

(56) References Cited

U.S. PATENT DOCUMENTS

| 273,526 | A | * | 3/1883 | Hayden | B65G 1/1371 186/16 |
| 2,592,898 | A | * | 4/1952 | Helberg | B65G 17/20 104/178 |
| 3,565,012 | A | * | 2/1971 | Nearman | B61B 10/025 104/172.4 |
| 4,211,172 | A | * | 7/1980 | Chapman | B61B 10/04 104/172.2 |
| 4,890,847 | A | * | 1/1990 | Cartee | F41J 7/02 273/406 |
| 5,172,640 | A | * | 12/1992 | Cathiard | B61B 7/04 104/173.2 |
| 6,206,170 | B1 | * | 3/2001 | Kissel | B65G 11/023 104/284 |
| 9,688,289 | B2 | * | 6/2017 | Luger | B61B 7/02 |
| 10,974,913 | B1 | * | 4/2021 | Nussbaum | B65G 47/96 |
| 2007/0034105 | A1 | * | 2/2007 | Mugnier | B61B 12/105 104/178 |

(Continued)

*Primary Examiner* — Jason C Smith
(74) *Attorney, Agent, or Firm* — Stoel Rives LLP

(57) ABSTRACT

A cart assembly system for handling laundry in a facility, the system including first and second support structures each having arms extending outwardly therefrom. The arms support drive wheels, which in turn support a tow line extending between the first and second support structures. The system may include a drop cord extending downwardly from the tow line and engaging a slot on a tow cart to attach the tow cart to the tow line. The system may also include a mast extending from the cart to the tow line, the mast supporting a clamp assembly for coupling the cart to the tow line. A controller drives one or both of drive wheels to move the tow line and the cart along the line pathway, where the cart transports laundry throughout the facility.

16 Claims, 6 Drawing Sheets

(56) References Cited

U.S. PATENT DOCUMENTS

| | | | |
|---|---|---|---|
| 2012/0187355 A1* | 7/2012 | Mehrkens | A63C 11/10 |
| | | | 254/222 |
| 2015/0322733 A1* | 11/2015 | Wells, Sr. | E21B 19/08 |
| | | | 104/89 |
| 2017/0073167 A1* | 3/2017 | Ookada | B65G 49/0422 |
| 2018/0194371 A1* | 7/2018 | Richard | B61B 7/04 |
| 2018/0244289 A1* | 8/2018 | Marnas | B61B 12/10 |
| 2019/0061785 A1* | 2/2019 | Sutter | B61B 11/004 |
| 2020/0079401 A1* | 3/2020 | Bunch | B61B 7/04 |
| 2020/0385029 A1* | 12/2020 | Erharter | B61B 7/00 |
| 2021/0024110 A1* | 1/2021 | Pfeifer | B61B 7/04 |

\* cited by examiner

CART CONVEYOR ASSEMBLY

RELATED APPLICATIONS DATA

This application is a nonprovisional of and claims the benefit under 35 U.S.C. § 119(e) of U.S. Provisional Patent Application No. 62/550,515, filed Aug. 25, 2017, the disclosure of which is incorporated by reference herein in its entirety.

TECHNICAL FIELD

The field of the present disclosure relates generally to cart conveyor assemblies and, in particular, to such conveyor assemblies for transporting laundry carts via an automated process in a laundry processing facility.

BACKGROUND

Conventional industrial laundry facilities process hundreds or thousands of pounds of laundry daily. In a typical process, incoming laundry is sorted into groups having similar wash requirements, washed, dried, and folded. During some or all of these tasks, the laundry may be transported to various areas of the facility equipped for the specific task. For example, laundry may be transported from the sorting area to the washers, from the washers to the dryers, and from the dryers to a folding station, and so forth. Because of the variety of work and tasks required to process laundry, laundry facilities need proper and efficient laundry handling systems to ensure that they are operating at an optimal level.

In many conventional facilities, laundry is loaded onto wheeled laundry carts and pushed from one area of the facility to another by a worker. The present inventor has recognized various disadvantages of this process. For example, this arrangement requires a worker to push laundry carts across the facility, thereby limiting the worker's ability to handle/process laundry or make other more impactful contributions. In addition, requiring workers to handle heavy laundry carts increases the risk of injury to the worker.

Accordingly, the present inventor has identified a need for an improved cart conveyor system designed to automate cart movement and minimize worker involvement in transporting carts. In addition, the present inventor has identified a need for such a conveyor system with a flexible and reconfigurable component design to facilitate the reconfiguration of the laundry flow in the plant or facility. Further, the present inventor has identified a need for such a conveyor system incorporating various features to ensure worker safety during operation. Additional aspects and advantages will be apparent from the following detailed description of example embodiments, which proceeds with reference to the accompanying drawings.

DETAILED DESCRIPTION OF EXAMPLE EMBODIMENTS

Figure 1:
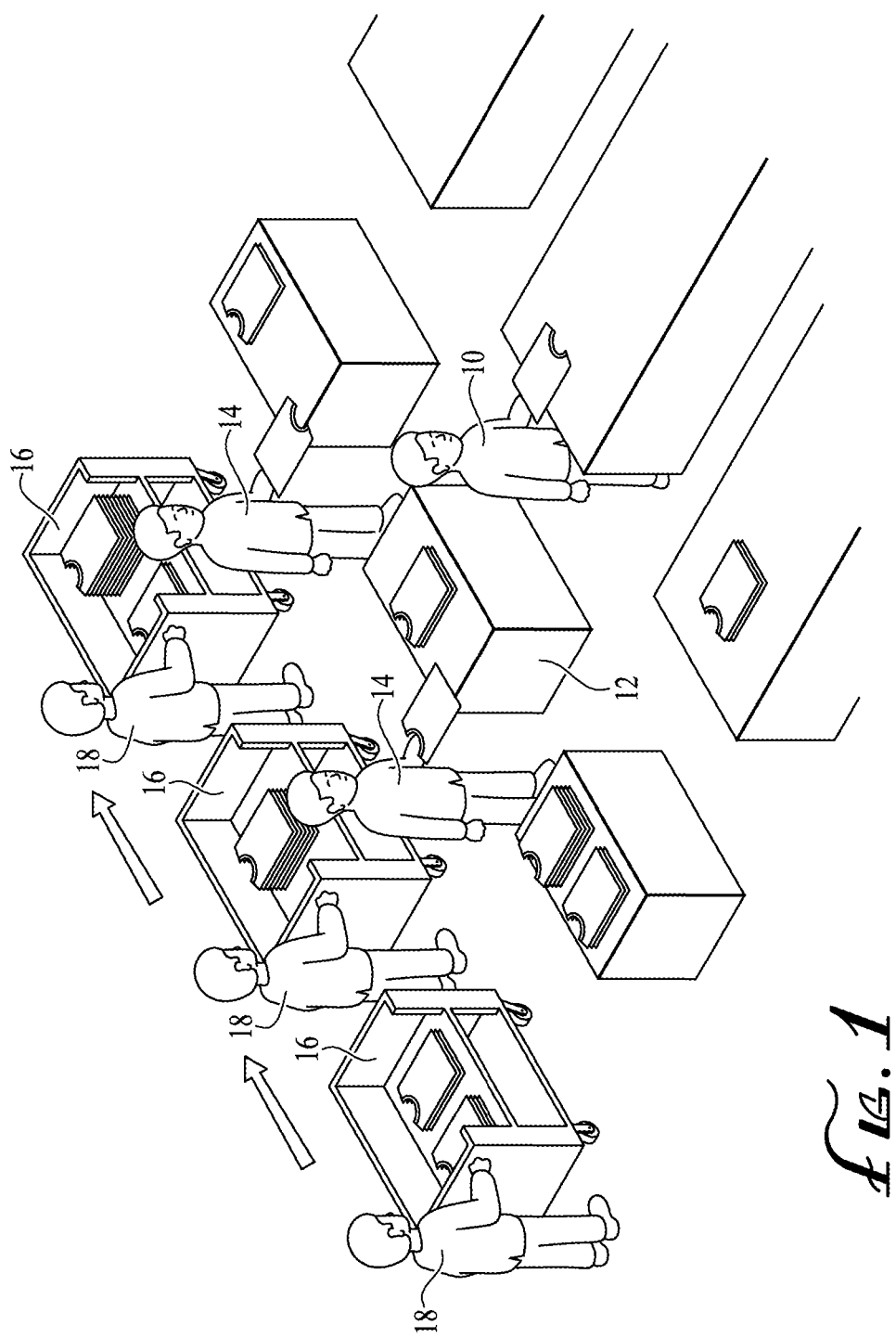
FIG. 1 is a pictorial view illustrating an example embodiment of conventional laundry management procedures.

With reference to the drawings, this section describes particular embodiments of an automated cart conveyor assembly and its detailed construction and operation. Throughout the specification, reference to "one embodiment," "an embodiment," or "some embodiments" means that a particular described feature, structure, or characteristic may be included in at least one embodiment of the automated cart conveyor assembly. Thus appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like.

In the following description, particular components of the automated cart conveyor assembly may be described in detail. It should be understood that in some instances, well-known structures, materials, or operations are not shown and/or not described in detail to avoid obscuring more pertinent aspects of the embodiments. In addition, although the embodiments may illustrate and reference particular designs, other embodiments may include additional or fewer components than the described embodiments. Finally, it should be understood that although the embodiments herein are described with reference to use in laundry processing facilities, the disclosed subject matter may be adapted for use in other suitable environments as well.

With general reference to the figures, the following disclosure relates an automated cart conveyor assembly 100 including an overhead line or cable system 102 having a tow line or tow cable 104 (hereinafter referred to as a "tow cable" with the understanding that the term "cable" is not intended to be limiting) and multiple drive pulleys or wheels 106 (hereinafter referred to as a "drive wheel") arranged to define a track for transporting one or more laundry carts 108 across a laundry facility. As is further described in detail below, the automated cart conveyor assembly 100 allows workers to attach loaded laundry carts 108 to the overhead cable system 102 to transport laundry via the cable system 102 to various processing stations of the laundry facilities, such as a sorting area, a washing/drying area, an assembly line area to create specific customer orders and a folding area for example, to reduce worker involvement in transporting laundry loads and maximize overall efficiency. Additional details relating to the automated cart conveyor assembly 100 are further described in detail below with particular reference to FIGS. 2-7.

FIG. 1 is a pictorial view illustrating an example embodiment of conventional laundry management procedures in a laundry facility. With reference to FIG. 1, in a conventional facility, a worker 10 may be tasked with removing laundry from the dryers and transporting the laundry to a station 12 for folding and loading by a second worker 14. Once the second worker 14 completes this task, the second worker 14 loads the laundry into one or more carts 16, which are pushed or pulled by additional workers 18. The loaded carts 16 may be transported to a staging area in the laundry facility for further processing and/or delivery out of the laundry facility. It should be understood that a similar process may be repeated in other areas of the facility. For example, one or more workers may sort laundry into specific wash requirements and load the laundry onto the carts for transport to the washers, or the laundry may be taken from the washers and loaded onto the carts for transport to the dryers. For any of these processes, the laundry facility typically requires workers to transport the loaded carts from one area to another, thereby making these particular workers unavailable to assist in other aspects of the laundry handling process. With particular reference to FIGS. 2-7, the following describes an improved laundry management procedure that uses an automated cart conveyor assembly 100 to optimize the laundry handling process.

Figure 2:
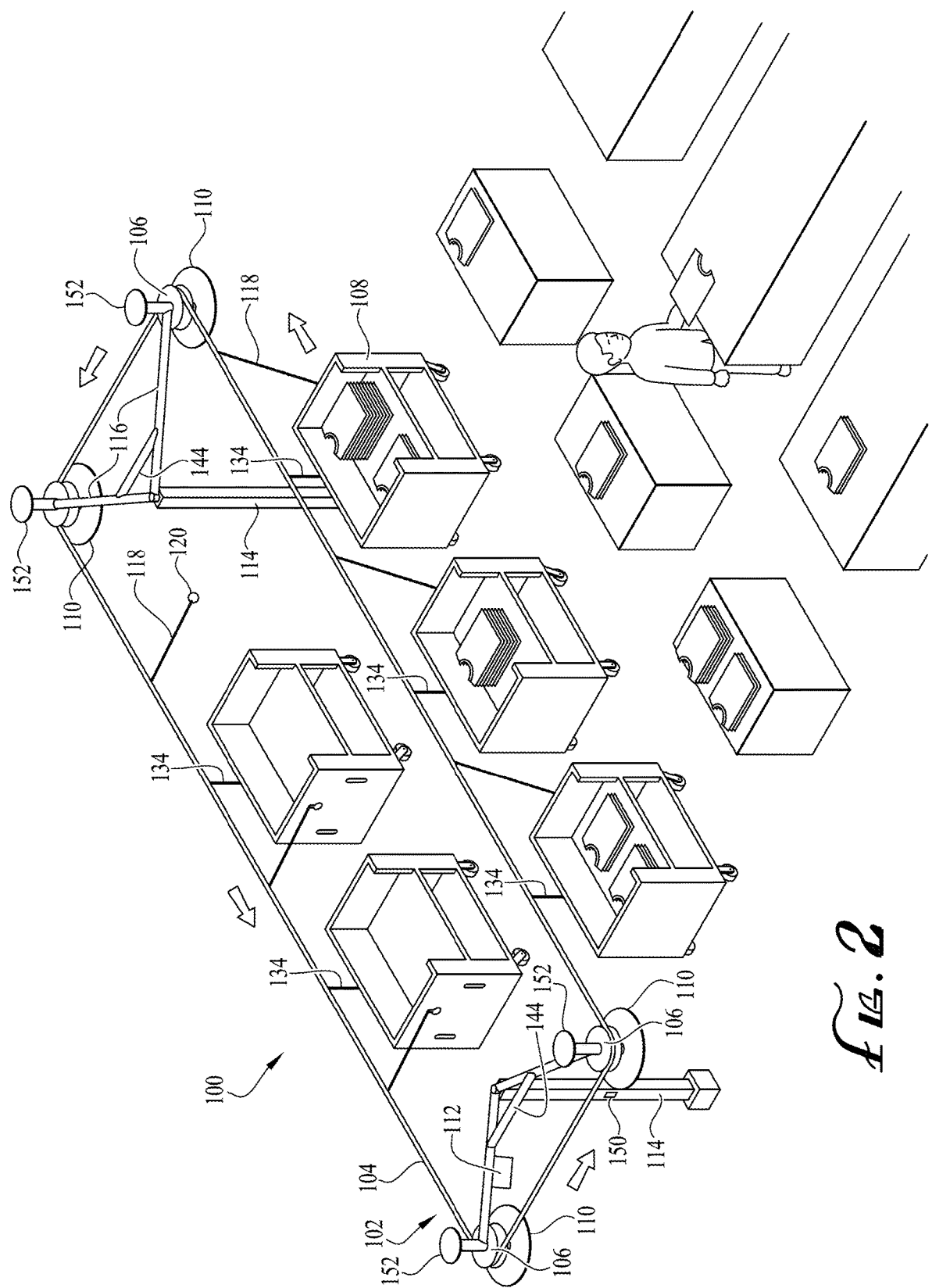
FIG. 2 is a pictorial view illustrating an automated cart conveyor assembly system for improved laundry management procedures in accordance with one embodiment.
Figure 3:
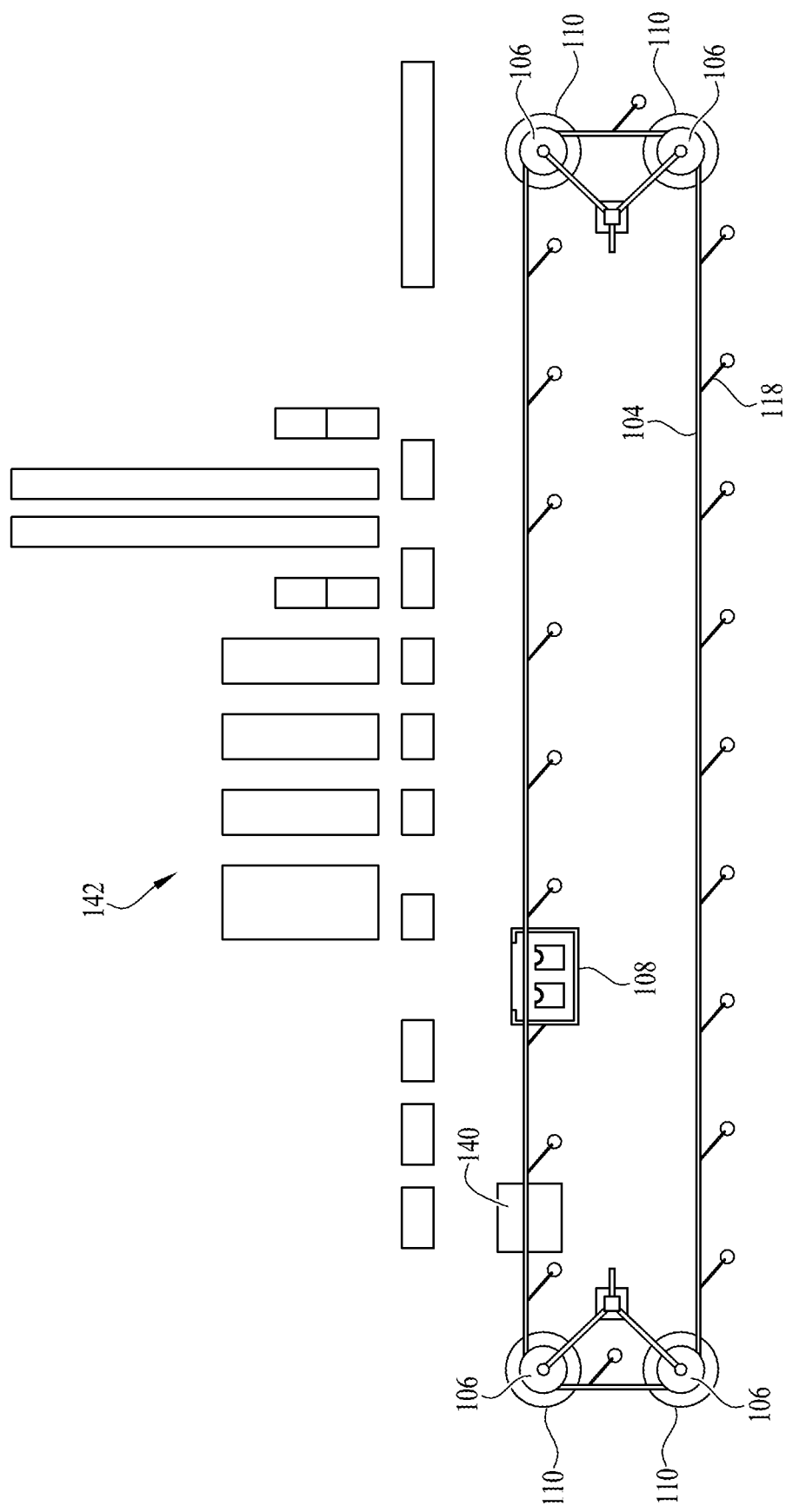
FIG. 3 is a plan view of the automated cart conveyor assembly of FIG. 2.

FIGS. 2 and 3 collectively illustrate an automated cart conveyor assembly system 100 in accordance with one embodiment. With particular reference to FIG. 2, the automated cart conveyor assembly system 100 includes an overhead cable system 102 operable to receive and transport one or more laundry carts 108 from one region of the laundry facility to another. The cable system 102 includes a taut tow cable 104 supported between a plurality of drive wheels 106. One or more laundry carts 108 may be attached to the tow cable 104 via a bracket assembly 134 (see FIG. 6) or other suitable system. A drive actuator or motor 112 powers the system 102 at a suitable speed to drive the tow cable 104 and guide the carts 108 along the pathway. Preferably, at least one of the drive wheels 106 is connected to the motor 112 to drive the cable system 102. In one embodiment, the cable system 102 includes a cog or V-belt pulley and gear box motor 112 connected to the drive wheel 106. In other embodiments, the cable system 102 may include any other suitable motors, and/or may include multiple motors.

As described above, the drive wheels 106 support a tow cable 104 and together form the cable pathway for the cable system 102. For improved traction and to create proper tension, the drive wheels 106 may include a spring loaded cable tensioner (not shown). The tow cable 104 may be of any suitable material capable of supporting the weight of the attached carts 108, while minimizing sagging to prevent the tow cable 104 from disengaging the drive wheels 106 and having sufficient wear resistant properties to maximize longevity. For example, in some embodiments, the tow cable 104 may be a stainless steel cable ranging in diameter from $1/16$ inch to $1/2$ inch. In other embodiments, the tow cable 104 may instead be a hollow braid polypropylene rope ranging in diameter from $1/4$ inch to $3/4$ inch. Preferably, the tow cable 104 is made from a material with sufficient strength properties to support a normal operating tension of at least 200-lbs and a surge load at start of at least 350-lbs. For example, in one embodiment, the tow cable 104 may be a stainless steel cable having an approximately $1/8$-inch diameter.

It should be understood that in other embodiments, the tow cable 104 may be made of other suitable materials depending on the transport load and surge load that the automated cart conveyor assembly 100 will handle during normal operation. In addition, it should be understood that the term "tow cable" is used for convenience purposes only and is not meant to limit the tow cable only to actual cables. Other lines, braided ropes, or other suitable components may be used without departing from the principles of the described subject matter.

In some embodiments, the wheels 106 may each include a guard 110 positioned underneath the wheels 106 to minimize exposure of the wheels 106 and help prevent accidental injury. For example, in one embodiment, the guard 110 may be a circular disc attached to the wheel shaft supporting the wheels 106, where the guard 110 extends beyond the edges of the respective wheels 106 such that the guard 110 acts as a barrier to protect the workers from injury. Preferably, the guard 110 is non-rotatably attached to the wheel shaft such that the guard 110 is fixed in position as the wheels 106 rotate. In some embodiments, the guard 110 may also function as a trap to catch the tow cable 104 in the event the tow cable 104 breaks or otherwise dislodges from the wheels 106. It should be understood that in other embodiments, the guard 110 may extend under the entirety of the tow cable 104 (with appropriate gaps or spacing to accommodate coupling and transport of the carts 108 via the tow cable 104) to further minimize risk of injury and to trap the tow cable 104 in the event of a rupture or dislodging.

Figure 4:
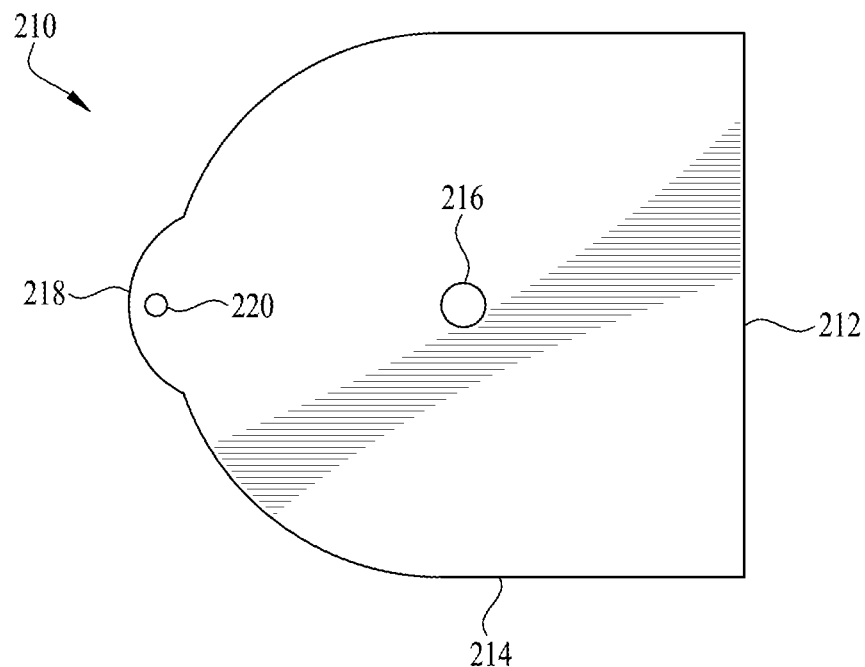
FIG. 4 is a view of an example embodiment of a guard for the drive wheels to protect against potential injury.

In other embodiments, the guard may have a different configuration than the round, disc shape of guard 110. For example, FIG. 4 illustrates another embodiment of a guard 210 that may be used with the automated cart conveyor assembly system 100. With reference to FIG. 4, the guard 210 includes a substantially straight portion 212 and a curved portion 214 extending around to connect on opposite ends of the straight portion 212, thereby forming a generally D-shaped shield. The guard 210 includes a central opening 216 having a suitable size and dimension to couple the guard 210 underneath the drive wheels 106, such as to the shaft of the drive wheels 106. In some embodiments, the curved portion 214 may include a second, smaller curved portion 218 on a tip thereof, the curved portion 218 including an opening 220 extending through the guard 210 for receiving a hook therethrough (as further described below) to further stabilize or fix the guard 210 in position and prevent its rotation relative to the shaft of the drive wheels 106.

The guard 210 (and the guard 110) may each be formed from any suitable material. For example, in one embodiment, the guards 110, 210 may be formed from a $3/16$-inch clear polycarbonate material. In other embodiments, other suitable materials may be used. Preferably, all edges of the guard 210 are smooth to minimize potential cuts or other injury in the event a worker contacts the guard 210. It should be understood that in other embodiments, the cart assembly system 100 may include a guard with other suitable configurations different than the illustrated embodiments.

During use, a worker processes the laundry and loads it onto the carts 108 when the laundry is ready for transportation. In some embodiments, the motor 112 may operate the cars at a sufficiently slow speed to allow workers to load the carts 108 without risk of injury. For example, in some embodiments, the carts 108 may be moved at a speed of approximately 2-3 feet per minute. In other embodiments, the movement speed of the cart may range between 1-5 feet per minute, or between 6-8 feet per minute, or at any other suitable speed as desired. Preferably, the carts 108 move slowly enough to minimize potential hazards and injury to the workers in the laundry facility, while also ensuring that the tow cable 104 is not pulled downwardly and/or away from the pulleys/drive wheels 106. In some embodiments, warning devices (e.g., alarms) and/or fencing/barricades may be used to provide additional safety barriers between the workers and the carts 108 being towed to avoid potential injuries. The following description provides additional details of various components of the cable system 102.

With reference to FIG. 2, the drive wheels 106 of the cable system 102 are supported by one or more stanchions 114. In some embodiments, each stanchion 114 may support a pair of pulleys or drive wheels 106 spaced apart from one another to create a generally L-shaped cable pathway, as illustrated in the figure. It should be understood that in other embodiments, multiple stanchions 114 may be used and arranged to create anyone of various suitable cable pathways. For example, in other embodiments, a third stanchion (not shown) may be incorporated into the cable system 102, the third stanchion having two additional, spaced apart drive wheels to create a generally triangular cable pathway for the carts 108. Alternatively, additional stanchions and drive wheels may be used to stabilize the tow cable 104 and help prevent the tow cable 104 from sagging or being pulled downwardly away from the drive wheels 106. For example, with reference to FIG. 2, the cable system 102 may incorporate an additional stanchion centered between the two stanchions 114, the stanchion having a pair of drive wheels at opposite ends to provide additional support for the tow cable 104. In other embodiments, still other arrangements may be used as desired.

The stanchions 114 and drive wheels 106 may be arranged in any one of a variety of suitable orientations. With reference to FIG. 3, the following describes one example arrangement with the understanding that other suitable arrangements are possible. With reference to FIG. 3, the stanchions 114 include a pair of arms 116 extending outwardly therefrom in a generally V-shaped configuration. The arms 116 each support a pulley or drive wheel 106 along their respective ends. In some embodiments, the arms 116 may each be telescoping arms to allow for adjustability of the position of the drive wheels 106 as desired. A cross-bar 144 may stretch across and connect the arms 116 to each other to provide additional stability and support.

In some embodiments, the arms 116 may include one or more hooks (not shown) extending downwardly therefrom and wrapping under the drive wheels 106 inside the path of the tow cable 104 to ensnare or catch the tow cable if it were to rupture or otherwise become dislodged from the drive wheels 106. For example, in one embodiment, a hook (which may be made of ½-inch stainless steel or other suitable material) may extend downwardly from each arm 116, where the hook includes a first vertical section of approximately 10 inches, and a bend of approximately 90 degrees toward the shaft of the drive wheels 106 to serve as a safety hook for the tow cable. In other embodiments, the hook may further be used to fix the guard 210 in position and help prevent its rotation relative to the drive wheels 106 as noted previously. For example, in such embodiments, the hook may include a first vertical section of approximately 10 inches, and then a first bend of approximately 90 degrees horizontal to the point of going through the opening 220 of the shield 210 with another 90 degree bend. The hook then bends back 90 degrees toward the shaft of the drive wheels 106 to serve as a safety hook for the cable.

One of the stanchions 114 (or a separate stanchion, not shown) may support a control box 150 operable to control operation of the drive wheels 106 (and control other components) of the automated cart conveyor assembly system 100. In some embodiments, the automated cart conveyor assembly system 100 may further include a bracket sensor (not shown) in communication with the control box 150, where the bracket sensor may signal the control box 150 to power off the automated cart conveyor assembly system 100 when the sensor detects that the bracket 134 attaching the cart 108 to the two cable 104 was not removed from the tow cable 104 at an appropriate time. Further details relating to bracket 134 are discussed below with reference to FIGS. 5 and 6.

In some embodiments, the automated cart conveyor assembly system 100 may further include a speed sensor system 152 operable to detect the speed of the tow cable 104. The speed sensor system 152 interacts with a proximity sensor (not shown) to detect an abnormal line speed of the tow cable 104 outside expected parameters, which may indicate that the tow cable 104 may have become dislodged from the drive wheels 106, or the traction between the tow cable 104 and drive wheels 106 has been lost. When the speed sensor system 152 determines that the tow cable 104 is moving at abnormal speeds, the speed sensor system 152 communicates with the control box 150 to shut off the automated cart conveyor assembly system 100 and prevent potential injury or damage to the system.

In some embodiments, the tow cable 104 may include a plurality of drop cords 118 attached thereto and spaced apart from one another at intervals along the tow cable 104. The drop cords 118 incorporate a key 120 formed on or attached to an end of the drop cord 118. As further explained in detail below with particular reference to FIG. 5, the key 120 is sized to engage with a key slot 128 formed on the carts 108 to attach the carts 108 to the tow cable 104. The drop cord 118 extend downwardly from the tow cable 104 to a suitable height such that the carts 108 may be connected to the tow cable 104, with the carts 108 remaining in contact with the ground. In some embodiments, the cords 118 and key 120 are formed as a single, unitary component relative to one another, and formed of the same materials as the tow cable 104. In other embodiments, the cords 118 and keys 120 may be separate components made of the same or different materials, with the components attached to one another.

Figure 5:
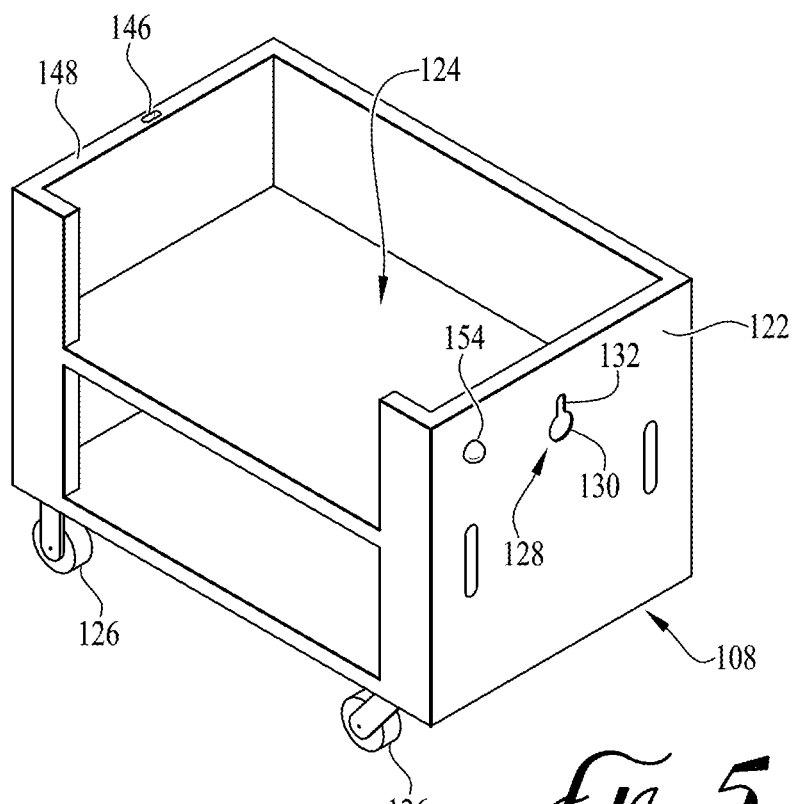
FIG. 5 is a pictorial view illustrating an example cart for the cart conveyor assembly of FIG. 2.

FIG. 5 is a pictorial view illustrating an example cart 108 in accordance with one embodiment. With reference to FIG. 5, the cart 108 includes a frame 122 surrounding an interior cavity 124 for receiving items, such as laundry, therein. The cart 108 includes a plurality of wheels 126 attached to the bottom portion of the frame 122 for maneuvering the cart 106. Along at least one of the side walls of the frame 122, the cart 108 includes a key slot 128 formed therein, the key slot 128 having suitable dimensions to receive the key 120 on the drop cord 118 to securably engage the cart 108 to the tow cable 104. For example, in one embodiment, the key 120 is generally a round ball with a 1/12 inch diameter, and the key slot 128 may have a generally round section 130 having a 2-inch diameter, the key slot 128 further including a smaller semi-circular notch 132 having a ⅜-inch diameter and formed above the round section 130. To engage the cart 108, the key 120 may be inserted through the round section 130 of the key slot 128 and moved upwardly to sit against the notch 132. In this configuration, the cart 108 is secured relative to the tow cable 104, with the wheels 126 resting on the ground surface such that the cart 108 moves along the ground surface as the tow cable 104 is driven along the drive wheels 106. In some embodiments, the cart 108 may include a second key slot (not shown) on an opposite wall of the frame 122 to provide two securement positions and further secure the cart 108 to the cable system 102.

In some embodiments, the carts 108 may each further include an emergency shut off button 154 in wireless communication with the control box 150. The button 154 may be used to send a signal to the control box 150 to immediately power off the automated cart conveyor assembly system 100 when desired. For example, if the workers 10 determine that the tow cable 104 has become dislodged or is about to rupture, or if the workers identify other potentially problematic conditions, the workers 10 can activate the button 154 on any one of the carts 108 to remotely shut down the automated cart conveyor assembly system 100. Once the issue has been resolved, the automated cart conveyor assembly system 100 may be operated once again via the control box 150, or via the button 154.

Figure 6:
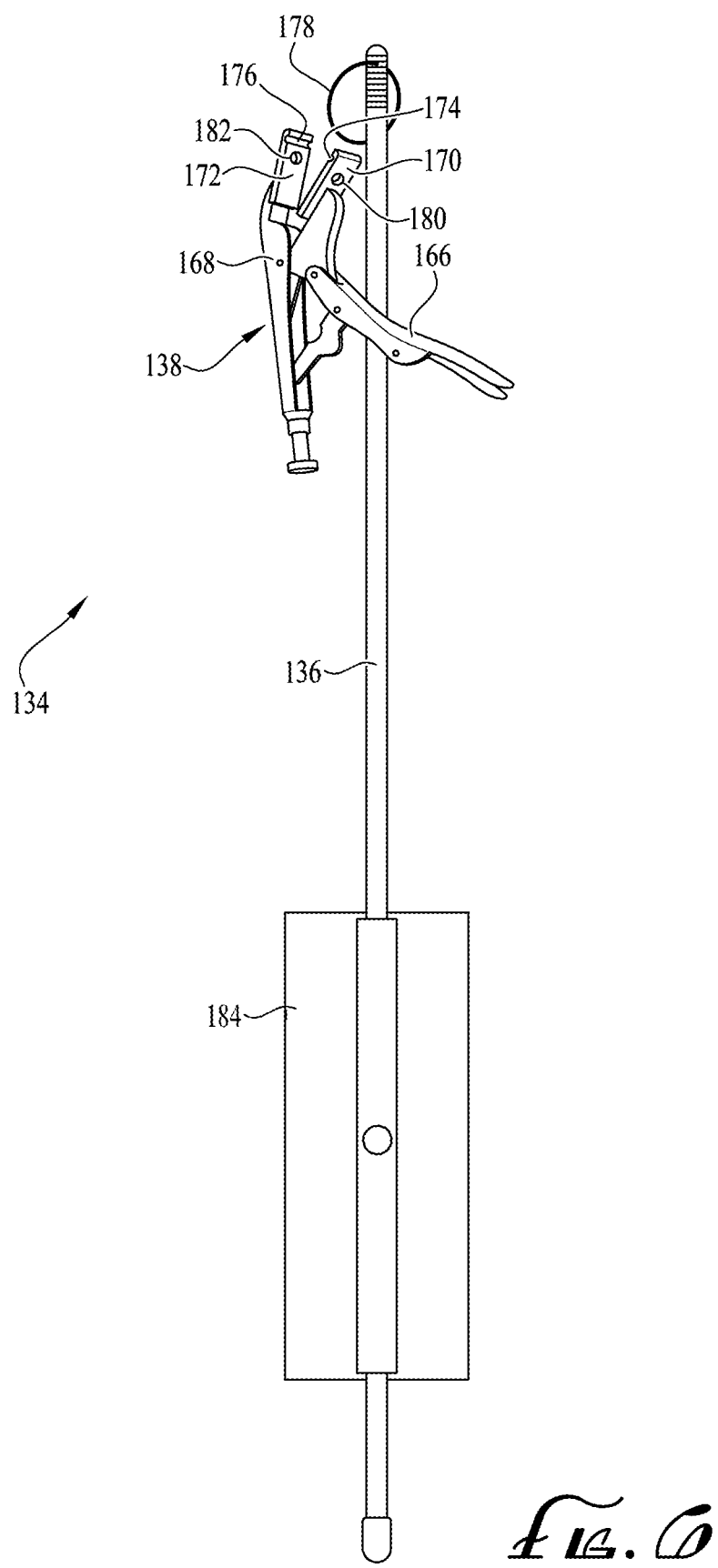
FIG. 6 illustrates an example embodiment of a clamp assembly of the cart conveyor assembly of FIG. 2.

In some embodiments, the automated cart conveyor assembly system 100 may further include a rigid attachment bracket 134 to help suspend and support the cable 102 when the cart is attached 108 thereto, and to help prevent the cable 102 disengaging from the drive wheels 106. With particular reference to FIG. 6, the bracket 134 is a generally elongate, tubular structure having a mast 136 and a clamp assembly 138 on an end of the mast 136. Preferably, the mast 136 is adjustable (e.g., by a telescoping or other suitable means) to lengthen or shorten the overall length of the bracket 134 as necessary when attaching the carts 108 to the tow cable 104 to ensure a proper connection. The mast 136 may be made of any suitable material with sufficient stiffness properties to ensure that the tow cable 104 remains taut when the cart 108 is attached. For example, in some embodiments, the mast 136 may be an adjustable fiberglass mast having at least a ½ inch diameter. In this arrangement, the cart 108 and bracket 134 help suspend the tow cable 104 overhead, and may help retain the cable 104 in the event of a breakage or disengagement from the pulleys or drive wheels 106, thereby helping prevent the tow cable 104 from becoming a tripping hazard if it were to fall onto the facility floor. In other embodiments, the mast 136 may be made of stainless steel or other similar materials.

The clamp assembly 138 includes a first leg 166 and a second leg 168 and may have a similar appearance to a set of pliers. As illustrated in FIG. 6, the first leg 166 includes a first plate 170 welded or otherwise coupled along an end thereof. Similarly, the second leg 168 includes a second plate 172 welded or otherwise coupled along an end thereof. In other embodiments, the plates 170, 172 may be formed as integral components of the legs 166, 168, respectively. Each of the plates 170, 172 includes a channel 174, 176, respectively, formed along an inside surface of the plates 170, 172 such that the channels 174, 176 face one another. The channels 174, 176 each have a depth that measures at least half of the diameter of the tow cable 104, such that the channels 174, 176 may securely receive the tow cable 104 therein when the legs 166, 168 are locked to attach the clamp assembly 138 to the tow cable 104. The clamp assembly 138 may include openings 180, 182 formed through the end plates 170, 172 to attach the clamp assembly 138 to a coupling ring 178 and thereby secure the clamp assembly 138 to the mast 136. In this configuration, the clamp assembly 138 allows the cart 108 to move as the tow cable 104 moves along the pathway. It should be understood that in other embodiments, the clamp assembly 138 may instead be formed as an integral component with the mast 136 without departing from the principles of the disclosed subject matter.

The bracket 134 may be coupled to the cart 108 along the end opposite the clamp assembly 138 in any one of a variety of suitable means. For example, in one embodiment, the cart 108 may have a slot or opening 146 extending through a top surface 148 of the cart 108 (see FIG. 5). In such embodiments, the mast 136 of the bracket 134 (without the plate 184) may be inserted through the opening or slot 146 to couple the bracket 134 to the cart 108. In some embodiments, an adhesive material may be introduced into the opening 146 after the bracket 134 is inserted to promote bonding of the bracket 134 and the cart 108 for a more secure fit.

In other embodiments, the bracket 134 may be mechanically fastened to the cart 108 by inserting suitable fasteners (e.g., threaded screws, nuts and bolts, etc.) through the plate 184 to affix the bracket 134 to the cart 108. In still other embodiments, the bracket 134 may be an integral component of the cart 108 or may be coupled to the cart 108 in other suitable methods.

Figure 7:
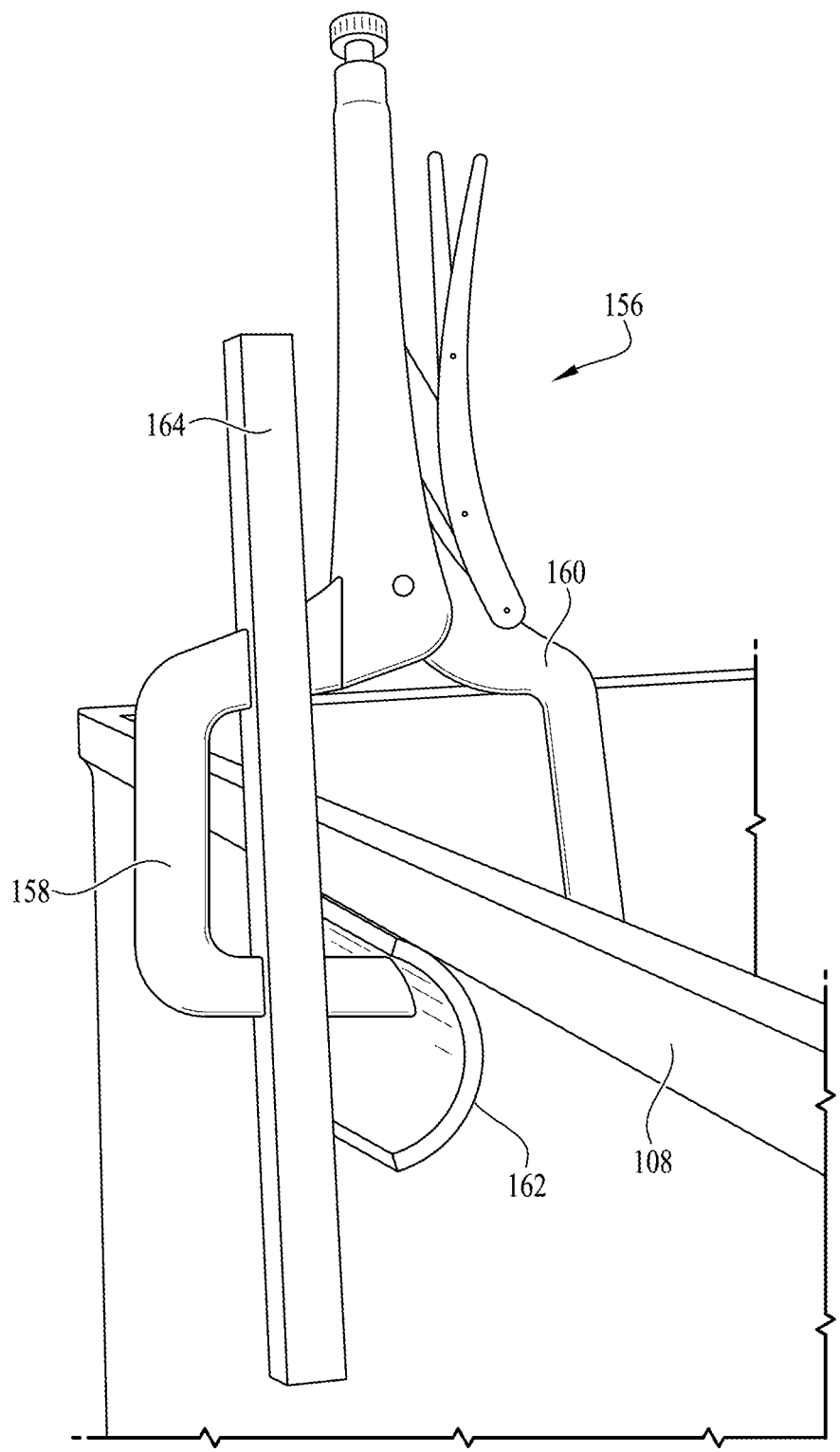
FIG. 7 illustrates an example embodiment of an attachment assembly bracket of the cart conveyor assembly of FIG. 2.

FIG. 7 illustrates an example embodiment of a coupling assembly 156 for facilitating connecting the cart 108 to the tow cable 104. With reference to FIG. 7, the coupling assembly 156 may include locking pliers that can be locked in a given position. With reference to FIG. 7, the coupling assembly 156 includes a first leg 158 and a second leg 160. The first leg 158 includes a curved end plate 162 that abuts against an outside edge of the cart 108 when the coupling assembly 156 is coupled to the cart 108. The second leg 160 includes a similarly curved end plate (not shown) that abuts against an inside edge of the cart in a similar fashion. The coupling assembly 156 further includes a receiving tube 164 with an open top end (not shown) designed to receive a bracket (e.g., bracket 134 of FIG. 6) for connecting the cart 108 to the tow cable 104. As designed, the coupling assembly 156 provides a sturdy grip to the cart 108 to ensure that the cart 108 remains properly secured in position during use of the automated cart assembly system 100. When the bracket (e.g., bracket 134) is inserted into the receiving tube 164, the cart 108 is connected to the tow cable 104 and ready for transport.

With particular reference to FIG. 3, the following describes an example operation process of the automated cart assembly system 100. As illustrated in FIG. 3, the cable system 102 forms a cable pathway between a pair of stanchions 116, with the tow cable 104 being driven by a motor 112 and the drive wheels 106. In the illustrated figure, the tow cable 104 moves in a counter-clockwise direction. When a cart 108 is ready to be loaded, the worker may reach for the drop cord 118 hanging from the tow cable 104 and inserts the cord 118 into the key slot 120 on the cart 108.

The bracket 134 is then connected to the tow cable 104 and the cart 108 via the clamp assembly 138. Once the cart 108 is secured, it is transported along the cable pathway until it reaches its desired location, at which point the cart 108 may be removed from the tow cable 104 by disengaging the clamp assembly 138 and releasing the drop cord 118 from the key slot 120. In some embodiments, the carts 108 may be transported over a scale 140 to obtain a weight measurement of the items (e.g., laundry) loaded in the carts 108 prior to removing the cart from the tow cable 104. In some embodiments, after unloaded the carts 108, the empty carts 108 may be connected back to the tow cable 104 to return the carts 108 to the working area 142 to be refilled as needed.

It should be understood that while the figures illustrate various example designs for an improved cart assembly system 100, other configurations may be possible without departing from the principles of the disclosed subject matter. In addition, although the description above contains much specificity, these details should not be construed as limiting the scope of the invention, but as merely providing illustrations of some embodiments of the invention. It should be understood that subject matter disclosed in one portion herein can be combined with the subject matter of one or more of other portions herein as long as such combinations are not mutually exclusive or inoperable.

The terms and descriptions used above are set forth by way of illustration only and are not meant as limitations. It will be obvious to those having skill in the art that many changes may be made to the details of the above-described embodiments without departing from the underlying principles of the invention.

The invention claimed is:

1. A system for automated movement of articles across a facility, the system comprising:
    a first support structure extending vertically from a ground surface of the facility, the first support structure having a first outwardly extending arm;
    a second support structure separate from and spaced apart from the first support structure, the second support structure extending vertically from the ground surface and having a second outwardly extending arm,
    a first drive wheel arranged horizontally and supported on an end of the first outwardly extending arm of the first support structure, and a second drive wheel arranged horizontally and supported on an end of the second outwardly extending arm of the second support structure, wherein the first drive wheel and the second drive wheel are horizontally offset from one another;
    a single tow line coupled to both the first and second drive wheels, the single tow line extending between the first and second drive wheels and defining a continuous line pathway therebetween;
    a cart having an interior cavity for receiving one or more articles therein, the cart further including rollers supporting the cart and operable to support maneuverability of the cart along the ground surface of the facility;
    an attachment bracket having an elongated mast with a first portion and a second portion, the first portion coupled to the single tow line;
    a coupling assembly coupled to the attachment bracket along the second portion thereof, the coupling assembly including a first leg and a second leg; and
    a controller in operable communication with one or both of the first and second drive wheels, the controller operable to drive the first and second drive wheels to move the single tow line along the continuous line pathway,
    wherein the coupling assembly is manually actuatable between a locked position and an unlocked position while the single tow line is moving along the continuous line pathway, whereat when the coupling assembly is in the locked position, the first and second legs engage against the cart to couple the cart to the single tow line and drive the cart along the ground surface of the facility as the single tow line moves along the continuous line pathway, and when the coupling assembly is in the unlocked position, the first and second legs disengage from the cart to release the cart from the single tow line, the coupling assembly being manually actuatable between the locked and unlocked position at every point along the continuous line pathway to respectively couple and release the cart from the single tow line at any point of the continuous line pathway.

2. The system of claim 1, further comprising a drop cord coupled to and extending downwardly from the tow line, wherein the drop cord is attachable to the cart.

3. The system of claim 2, wherein the drop cord is coupled to the tow line along a first end and to the mast of the attachment bracket along a second end, the drop cord accommodating movement of the cart around the first drive wheel and around the second drive wheel as the cart moves along the line pathway.

4. The system of claim 1, wherein the coupling assembly includes a hollow receiving tube with an open end, and wherein the mast of the attachment bracket extends through the open end and into the hollow receiving tube to couple the attachment bracket with the coupling assembly.

5. The system of claim 1, further comprising a guard disposed underneath each of the first and second drive wheels and non-rotatably coupled to a wheel shaft of each of the first and second drive wheels, respectively, the guard having at least a portion of an outer perimeter extending beyond a corresponding outer perimeter of the respective first and second drive wheels.

6. The system of claim 1, further comprising:
    a speed sensor system operable to determine an operating speed of the tow line; and
    a proximity sensor, wherein the speed sensor system interacts with the proximity sensor to determine the operating speed of the tow line.

7. The system of claim 6, wherein the speed sensor system is in operable communication with the controller, and wherein the speed sensor system sends a signal to the controller to deactivate the drive wheels when the speed sensor system determines that the operating speed of the tow line is outside a predetermined range.

8. The system of claim 1, wherein the cart further includes a button in wireless communication with the controller, wherein the button is actuatable to send a signal to the controller to deactivate the drive wheels.

9. The system of claim 1, further comprising a first hook coupled to the first arm of the first supporting structure, wherein the hook is operable to ensnare the tow line when the tow line dislodges from the first drive wheel.

10. The system of claim 1, further comprising a locking plate positioned between the attachment bracket and the cart, the locking plate receiving one or more fasteners to secure the attachment bracket to the cart.

11. The system of claim 1, further comprising an opening extending through a top surface of the cart, the opening sized and dimensioned to receive the first portion of the attachment bracket to couple the attachment bracket to the cart.

12. The system of claim 1, wherein the first support structure further includes a third outwardly extending arm spaced apart from the first outwardly extending arm, and wherein the second support structure further includes a fourth outwardly extending arm spaced apart from the first outwardly extending arm, the system further comprising:
    a third drive wheel arranged horizontally and supported on an end of the third outwardly extending arm of the first support structure; and
    a fourth drive wheel arranged horizontally and supported on an end of the fourth outwardly extending arm second support structure, wherein the third drive wheel and the fourth drive wheel are horizontally offset from one another, wherein the single tow line is coupled to the third drive wheel and the fourth drive wheel.

13. The system of claim 12, wherein the first and third outwardly extending arms of the first support structure are arranged in a V-shape relative to one another, and wherein the second and fourth outwardly extending arms of the second support structure are arranged in a V-shape relative to one another, the system further comprising:
    a first cross bar extending between the first and third outwardly extending arms of the first Support structure; and
    a second cross bar extending between the second and fourth outwardly extending arms of the second support structure.

14. The system of claim 1, wherein the first outwardly extending arm of the first support structure and the second outwardly extending arm of the second support structure are each telescoping to adjust a position of the first drive wheel and the second drive wheel, respectively.

15. The system of claim 1, wherein the first and second drive wheels are coplanar and wherein the continuous line pathway of the tow line is arranged along a single plane between the first and second drive wheels.

16. The system of claim 1, wherein the first drive wheel operates independently of the second drive wheel.

* * * * *